Figure 1:
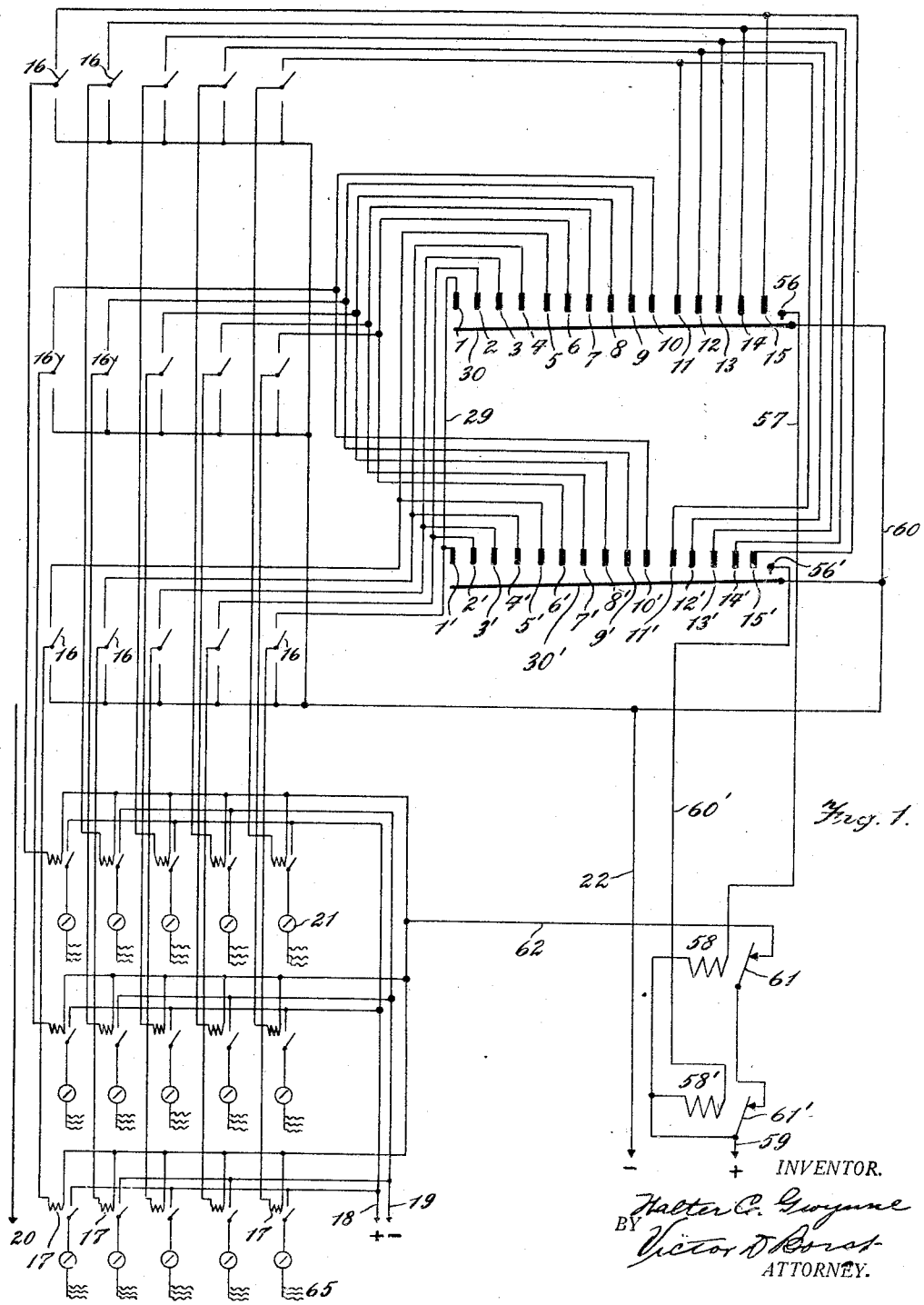

April 7, 1931. W. C. GWYNNE 1,799,789
STAGE LIGHTING SYSTEM
Filed Jan. 7, 1928 2 Sheets-Sheet 1

INVENTOR.
Walter C. Gwynne
BY Victor D. Borst
ATTORNEY.

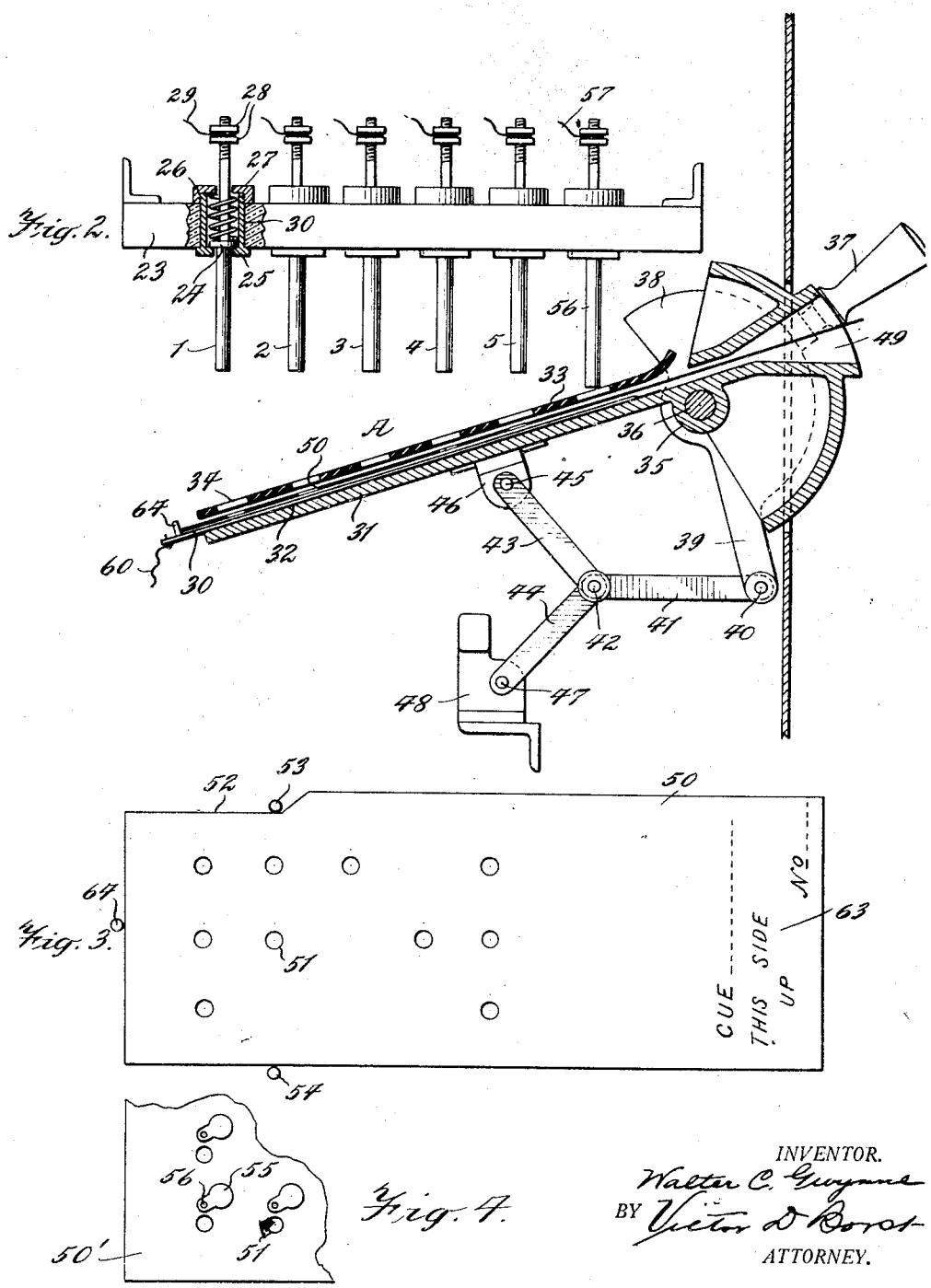

Patented Apr. 7, 1931

1,799,789

UNITED STATES PATENT OFFICE

WALTER C. GWYNNE, OF HOLLIS, NEW YORK, ASSIGNOR TO METROPOLITAN ELECTRIC MFG. CO., A CORPORATION OF NEW JERSEY

STAGE-LIGHTING SYSTEM

Application filed January 7, 1928. Serial No. 245,133.

My invention relates to lighting systems for the stages of theatres, opera houses and the like, and has for its object the provision of a method and means for readily controlling the turning on and off of various preselected combinations of lights to produce desired effects.

In the lighting systems of stages it is customary to provide parallel rows of incandescent lamps of different colors, for example, three rows of lamps colored respectively white, red and blue. Thus the footlights will consist of one row of white lamps, one row of red lamps and one row of blue lamps, said rows being placed in juxtaposition with respect to each other and each row being fed by current supply wires which are energized by a circuit closing and opening relay, and a hand switch is mounted on a control switchboard for energizing and de-energizing the relay. In addition to the circuits for the footlights there will be individual circuits for illuminating other parts of the stage, for example, there will be a circuit of lights of each color for the proscenium, another for each of the borders, viz. the concert border and borders Nos. 1, 2 and 3, etc. Each circuit referred to is supplied with current from the service supply and is controlled by its own hand switch mounted on the control switchboard, and usually operating a relay in a suitably protected location for connecting the lamp circuit with the service supply conductors.

In the lighting of a stage performance it is necessary to plan in advance which lights, i. e. rows of lights, are to be turned on or off at any given time in order to produce the desired effects. Heretofore this has been done by means of an instruction sheet or chart made up in advance of the performance by the stage electrician for the guidance of the switchboard operator, and sets forth in regular order or sequence the various combinations of lights or circuits which are to be turned on and off as the performance progresses. Each of these combinations is known as a pre-set and represents a definite combination of lights to produce a desired lighting effect, for example it might be red footlights and red borders 1 and 2—a total of three circuits, which would mean that three of the individual hand switches would have to be closed and all the rest of them open. The pre-set immediately following might require the opening of each of the three switches last mentioned and the closing of five other switches. In case the operator fails in any respect to follow the instruction sheet, or in case of any error in the instructions of said sheet, there will necessarily be an error in the lighting of the set or scene which will be visible to the audience.

My invention has for its object the provision of a novel method and means for controlling the closing and opening of various combinations of individual circuits in proper sequence for producing desired effects, the controlling means being prepared in advance and comprising mechanical devices which may be manipulated to select and determine the circuits to be energized for each pre-set constituting the lighting sequence, whereby instruction sheets and the errors which accompany their use are entirely done away with and the lighting sequence may be carried on with much greater ease than formerly and practically without any chance of error.

Reference is hereby made to the accompanying drawing of which Figure 1 is a diagram showing the electric wiring of a system operating in accordance with my invention. Figure 2 is a side elevation, partly in section, showing the operating contacts of some of the individual circuits and the means for applying current thereto. Figure 3 is a detail view of a templet or pattern plate for selecting the circuits to form a desired preset, and Figure 4 is a similar view of a modified form of templet.

In Figure 1 is illustrated an assembly of 15 individual circuits which are connected respectively to fixed contacts 1 to 15 inclusive, and there is preferably a second set of fixed contacts 1' to 15' inclusive connected respectively in multiple with the contacts 1 to 15, the geometrical arrangement of the contacts 1' to 15' being identical with that of contacts 1 to 15. Each of the fixed contacts is connected by a lead or wire as shown with one terminal of a single pole, double throw switch 16, and the blade of each of these switches is connected with a relay 17 for closing one of the individual circuits for supplying current to the various lamps or rows of lamps used for stage illumination, i. e. footlights, proscenium lights, concert borders, etc. These individual lighting circuits are fed from any suitable main service wires, as for example the service wires 18 and 19 of a three-wire system which includes also the neutral wire 20, and each of these circuits is provided with a dimmer 21 of usual or ordinary construction. In practice, a plurality of wires 65 may be used for supplying current to the lamps of what I have described as an individual circuit, i. e. the lamps of a single row may be connected in several groups instead of one, but everything controlled by one of the relays is considered here as an individual circuit although technically it might comprise several circuits.

Each of the relays 17 on account of being connected to the blade of a double throw switch 16 can be energized in two ways, i. e. (1) when the blade of the switch 16 is down the relay will be electrically connected with service wire 22 and a circuit closed from service wire 59 through circuit breaker arms 61' and 61 and wire 62 through said relay, and (2) when the switch blade 16 is up the relay will be connected with one of the fixed contacts of each set of fixed contacts 1 to 15 and 1' to 15', and may be energized thereby by means which will now be described.

Referring to Figure 2 the contacts 1, 2, 3, 4 and 5 are shown mounted in a row and supported by an insulating block 23. Each of these contacts is exactly similar to the others and comprises an elongated pin 1 having an integral collar 24 which is normally held by spring 30 in engagement with the flange 25 of a bushing 26. The upper end of the bushing is threaded and an internally threaded cap 27 engages therewith and secures the bushing firmly in its position in the block 23. The upper portion of the pin 1 is of reduced cross section, threaded as shown, and provided with nuts 28 between which is clamped the wire 29 for connecting same with the upper terminal of switch 16. The coil spring 30 surrounds the pin 1, one end of said spring engaging the collar 24 and the other the cap 27, whereby the pin 1 is normally held in the position shown in the drawing but is capable of movement in a vertical direction, against the elastic pressure of the spring.

For the purpose of energizing the various pins 1 to 15, which in the device shown, are arranged at equal distances apart in three rows of five pins each, I provide a master switch A, which comprises a master contact plate 30, mounted upon and rigid with a pivotal carrier or body 31, a sheet of insulating material 32 being interposed between said members. There is also a guide 33 of a suitable insulating material having considerable strength, for example, fibre, bakelite, etc. This guide plate is rigidly secured to the body 31 by any suitable means and is provided with perforations 34 corresponding in geometrical arrangement to the pins 1 to 15, i. e. there is one perforation corresponding in position to each pin and of such diameter as to permit the pin to pass therethrough in order to make contact with the contact plate 30, when the carrier 31 is operated by means which will now be described.

The carrier 31 is provided with a bearing 35 which turns upon a rod 36 fixedly supported by the switchboard, so that the carrier 31 may be moved from the position shown into proper position for the contacting of the plate 30 with the ends of the pins 1 to 15. The means for rotating said carrier consist of a handle 37 rigid with a sector 38 having a downwardly extending arm 39 which is pivotally connected at 40 with a link 41, and the latter is pivotally connected at 42 with toggle arms 43 and 44. The arm 43 is pivoted at 45 to a lug 46 which is secured to the lower surface of the carrier 31. The arm 44 is pivoted at 47 to a support 48 rigid with the switchboard. The carrier 31 at the end adjacent the handle 37 is formed with a tapered opening 49, which leads into the space between the guide plate 33 and carrier 31.

In order that the operation of the master switch A may be selective as regards the contacts 1 to 15 and the circuits connected therewith, means are provided for permitting some of said pins to contact with the plate 30 and at the same time preventing others of the pins from making contact. Various instrumentalities may be employed for this purpose and I have shown a pattern plate or templet 50. This plate is of any suitable insulating material, for example, paper of the character used in sockets for electric lamps, etc. and is provided with perforations 51 of such size as to permit the passage therethrough of the ends of the pins 1 to 15. These perforations are arranged in a pattern which will produce the desired effect, i. e. if the pins 1 to 5, for example, control respectively the blue footlights, blue proscenium lights, blue concert borders and blue borders 1 and 2, and it is desired to light all of these lamps except the blue concert border, then the openings shown in the central row of Figure 3 will be formed which will admit the passage of the pins 1, 2, 4 and 5 but will prevent pin 3 from making contact with plate 30. Other rows of perforations are also shown, and these correspond to certain of the other pins 6 to 15. For instance, in the example shown, the top row of openings in the templet may control the circuits for the white footlights, proscenium lights, concert lights and second border, and the openings in the bottom row may control the red footlights and red lights of border No. 2.

The perforations 51 may be made in the sheet in any desired manner as, for instance, a punch may be mounted upon the switchboard which will consist of a die having 15 openings corresponding exactly in geometrical arrangement with the pins 1 to 15. Means will be provided for securing a blank sheet 50 upon the die and a movable punch will be mounted for horizontal and vertical movement so as to register with any of the desired openings in the die and the operator will thereby be able to punch in the sheet 50 any desired arrangement or pattern of openings 51 which will enable the master switch A to select the desired combination of circuits for illumination. These sheets will preferably all be punched in advance of the performance and may bear suitable indicia 63 for indicating the cue, number, etc., so that when properly filled out with cue, sequential number, etc. the switchboard operator will be provided with mechanical means properly indexed for producing the desired illuminating effects in their desired order or sequence.

In order to prevent the possibility of the templet 50 being inserted into the switch A in a reversed position, as for example, up side down, or wrong end first, one of the forward corners of the sheet is cut away as shown at 52 and guide pins 53 and 54 are carried by the plate 31 in such position that it will be impossible to insert the sheet 50 in any position except the proper one. The side walls of opening 49 also act as lateral guides for the sheet 50, and the pin 64 rigid with plate 30 limits its movement in an endwise direction.

Instead of using blank sheets 50 and punching out a desired pattern, I may instead provide a sheet 50′ as shown in Figure 4 which may be called a universal templet or pattern plate since it can be used for producing any desired pattern without resorting to a punching operation. This sheet or templet is provided with openings 51 corresponding exactly in number and geometrical arrangement with the pins 1 to 15, for example, 3 parallel rows of five openings each, and adjacent each opening is a small cover plate or tab 55 preferably of the same material as the templet and pivotally united thereto by a rivet 56 so that the cover tab may be turned on its pivot to either cover or uncover the opening 51 as desired. In using this form of templet all that the operator needs to do is to take as many of the sheets 50′ as are necessary for the sequence of illuminating effects which are to be produced, and arrange the cover tabs 55 of each of the templets 50′ so as to produce the desired effect, applying to each templet, designating indicia as regards cue, number, etc. Obviously, these templets can be used over and over again since the cover tabs 55 can be arranged or rearranged to form any possible combination for which the pins 1 to 15 are wired.

Safety means are provided for preventing the energizing of any of the pins 1 to 15 under certain circumstances, as for example when the operator, through negligence or oversight, fails to insert the templet before operating the master switch. The means shown comprises a pin 56 similar in all respects to the pin 1 except that it is longer and its extremity therefore extends below the ends of the pins 1 to 15 and will be contacted by the plate 30 in advance of any of the pins 1 to 15. This pin 56 is connected by a wire 57 through a circuit breaker 58 with the line wire 59 and the contact plate 30 is connected by the wire 60 with the line wire 22. Consequently, when the plate 30 contacts with the end of the pin 56, a circuit will be closed through the circuit breaker 58, which will throw the arm 61 and open the connection between line wire 59 and wire 62 which forms one of the energizing line connections of each of the relays 17 as shown. Under these circumstances, the circuit breaker arm being open, it will be impossible for any of the lights of the circuits controlled by contacts 1 to 15 to be illuminated.

Obviously when one of the templets 50 is in its proper position in the master switch, the pin 56 will be unable to contact with the plate 30 and the circuit breaker arm 61 will remain in its closed position, so that the relays 17 may be operated.

The effect of the contacting of one of the pins 1 to 15 with the plate 30 of the master switch will be the closing of a circuit which will now be traced with respect to the pin 1 and it will be understood that the circuits for the other pins are similar thereto and in multiple therewith. This circuit is from line wire 22 and wire 60 to contact plate 30, pin 1, wire 29, switch 16, relay 17, wire 62, circuit breaker arms 61 and 61′ to line wire 59.

While the single set of pins 1 to 15 is capable of producing any desired sequence of lighting effects, in practice it is desirable to have two master switches connected in multiple with each other so that they can be used in alternation, i. e. while one of the switches is closed the second switch is open, and the operator can remove therefrom the templet which has been used and substitute the templet for producing the effect which is to follow in sequence the one at that time being produced by the first switch, so that one desired result can follow another immediately, the only interval between the two being that occupied in opening one master switch and closing the other. These two switches can, if desired, be operated simultaneously, so that there will be no appreciable interval. These results are accomplished by duplicating the switch A and connecting same as shown in Figure 1 in which 30' represents the contact plate of the second master switch, and the contacts 1' to 15' correspond in exact geometrical arrangement with the contacts 1 to 15, so that if the same templet or pattern is used in the second switch, exactly the same lighting effect will be produced as in the first switch. In other words they are duplicates of each other for the purpose of enabling the operations to be carried out in a continuous manner.

The second master switch is also provided with a safety device pin 56' similar to the pin 56 and the same is connected to wire 60', circuit breaker 58' and line wire 59, and the arm 61' of circuit breaker 58' is in series with the arm 61 of circuit breaker 58 as shown.

The apparatus herein disclosed may be used as follows:

The stage electrician will prepare a series of templets or pattern plates of the form shown in either Figure 3 or Figure 4 in each of which templets the openings 51 will be so arranged as to permit the passage of such of the pins 1 to 15 or 1' to 15' as are necessary to produce the desired lighting effect. The order in which these templets are to be used will be indicated by giving each templet a serial number in the space indicated thereon for this purpose, and the blank for indicating the cue or time at which the templet is to be used in the course of the production will also be filled in. These templets will be delivered to the switchboard operator before the opening of the performance and he will have them arranged in correct order for use. Templet No. 1 will be inserted in the master switch A and No. 2 in the other master switch. Each of the switches 16 will be in its upper closed position. Whenever it is desired to turn on the lights for the first pre-set, the operator will grasp the handle 37, moving it downward and causing the carrier 31 to turn on pivot 36, whereby the pins 1 to 15 pass through the opening 34 of the guard 33 and such of the pins as are necessary to produce the desired pre-set pass through openings 51 of the first templet 50 of the series or sequence, so that their ends contact with the master contact plate 30. Such contact closes a circuit through each of the pins corresponding to an opening in the templet and thereby energizes the relay 17 which is electrically connected to such pin. The energizing of the relay closes the supply circuit for the lights which are controlled by said relay. When the time arrives for the changing of the first pre-set to the second, the operator will move handle 37 up so as to open the circuits previously referred to and will simultaneously move in a downward direction the handle of the other master switch so as to select and energize the proper circuits for producing the second pre-set. After this has been done the operator has plenty of time in which to withdraw from master switch A the first templet and insert in its place the templet which constitutes No. 3 of the series or sequence and this templet will be brought into action at the time that the master switch having in it templet No. 2 is moved to extinguish the lights of the second pre-set. Thus the first master switch A will make use of templets 1, 3, 5, 7, etc., and the other master switch will make use of templets Nos. 2, 4, 6, etc., the master switches being operated in alternation throughout the progress of the performance to produce the desired lighting effects.

Having now described my invention what I claim is:

1. In a stage lighting system, an assembly of lighting circuits, a master switch for selecting and energizing any two or more of said circuits, and safety means including a contact on said switch functioning with said master switch to prevent the closing of said circuits.

2. In a stage lighting system, an assembly of lighting circuits, a master switch for selecting and energizing any two or more of said circuits, safety means functioning with said master switch to prevent the closing of said circuits, and means to prevent the functioning of said safety means.

3. In a stage lighting system, an assembly of lighting circuits, each of which has two contacts in multiple, master switches cooperating with both sets of contacts for selecting and energizing any two or more of said circuits, and safety means constituting a part of said switches functioning with each of said master switches to prevent the closing of said circuits.

4. In a stage lighting system, an assembly of lighting circuits, each of which comprises a spring mounted pin, a templet having openings corresponding in position to two or more of said pins, a conductor for contacting the pins opposite said openings, means for causing relative movement of conductor and pins to close the circuits corresponding to the openings of the templet, and safety means for preventing the closing of any of said circuits and comprising a spring mounted pin so placed as to be contacted by the conductor in advance of said first named pins.

5. In a stage lighting system, an assembly of lighting circuits, each of which comprises a spring mounted pin, a templet having openings corresponding in position to two or more of said pins, a conductor for contacting the pins opposite said openings, means for causing relative movement of conductor and pins to close the circuits corresponding to openings of the templet, safety means for preventing the closing of any of said circuits and comprising a spring mounted pin so placed as to be contacted by the conductor in advance of said first named pins and means for preventing the functioning of said safety means.

In witness whereof, I hereunto subscribe my signature.

WALTER C. GWYNNE.